US008887209B2

(12) United States Patent
Rudolph et al.

(10) Patent No.: US 8,887,209 B2
(45) Date of Patent: Nov. 11, 2014

(54) PAIRING A REMOTE CONTROL AND A TELEVISION

(75) Inventors: Daniel L. Rudolph, Castle Rock, CO (US); Michael T. Dugan, Parker, CO (US); Mark H. Gomez, Parker, CO (US); Tyler S. Gilbert, Brighton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1401 days.

(21) Appl. No.: 10/936,254

(22) Filed: Sep. 7, 2004

(65) Prior Publication Data

US 2006/0053444 A1 Mar. 9, 2006

Related U.S. Application Data

(60) Provisional application No. 60/651,481, filed on Sep. 5, 2003.

(51) Int. Cl.
| | |
|---|---|
| *H04N 7/18* | (2006.01) |
| *H04N 5/44* | (2011.01) |
| *H04N 5/445* | (2011.01) |
| *G09B 21/00* | (2006.01) |
| *H04N 5/46* | (2006.01) |

(52) U.S. Cl.
CPC .......... *H04N 5/4403* (2013.01); *H04N 5/4401* (2013.01); *G08C 2201/20* (2013.01); *H04N 5/44582* (2013.01); *G09B 21/003* (2013.01); *H04N 5/46* (2013.01)

USPC .................. 725/80; 725/25; 725/31; 725/38; 725/56; 725/61; 725/74; 725/86; 725/87; 725/134

(58) Field of Classification Search
CPC .......... H04N 214/126; H04N 214/147; H04N 214/2204
USPC ........... 725/38, 25, 31, 56, 61, 74, 80, 86, 87, 725/134
See application file for complete search history.

(56) References Cited

U.S. PATENT DOCUMENTS

| | | | | |
|---|---|---|---|---|
| 6,031,580 | A * | 2/2000 | Sim ................................. | 725/43 |
| 7,028,331 | B2 * | 4/2006 | Schwalb ....................... | 725/140 |
| 7,053,811 | B2 * | 5/2006 | Aratani et al. ................ | 341/173 |
| 7,134,131 | B1 * | 11/2006 | Hendricks et al. .............. | 725/31 |
| 7,266,701 | B2 * | 9/2007 | Hayes et al. .................. | 713/185 |
| 2002/0089427 | A1 * | 7/2002 | Aratani et al. ........... | 340/825.72 |
| 2003/0048757 | A1 * | 3/2003 | Accarie et al. ................ | 370/257 |
| 2004/0068752 | A1 * | 4/2004 | Parker ........................... | 725/120 |

* cited by examiner

*Primary Examiner* — Jivka Rabovianski
(74) *Attorney, Agent, or Firm* — Seed IP Law Group PLLC

(57) ABSTRACT

The present invention is a method for associating remote controls and televisions. More specifically, the present invention permits delivery of television programming to multiple televisions from a television converter device. Other features and advantages of the present invention will become apparent from the following detailed description of the invention and the accompanying drawings.

18 Claims, 11 Drawing Sheets

T  V  #  1

PAIRING A REMOTE CONTROL AND A TELEVISION

RELATED APPLICATIONS

This application claims priority to U.S. application Ser. No. 10/655,641, filed Sep. 5, 2003, titled METHOD AND APPARATUS TO PAIR A REMOTE CONTROL AND A TELEVISION, which application was converted to Provisional Application Ser. No. 60/651,481 under 37 C.F.R. §1.53(c)(2) on Feb. 2, 2004, which application is incorporated herein by reference.

FIELD OF THE INVENTION

The present invention relates to remote controls used with television converter devices. More particularly, the invention relates to a method and apparatus for pairing several remote controls with several televisions. The televisions being supplied signals from one television converter having several channel selecting resources.

BACKGROUND

The prior art includes various devices that can receive television signals. These devices may be provided to subscribers of a pay television service. A pay television service may involve, in part, a pay television distributor transmitting television signals to a group of subscribers. Cable television companies are common pay television distributors. More recently, satellite television distributors have begun providing pay television service.

Many television converters may send television signals to a single television. More recent television converters may send television signals to several televisions. Each of these separate televisions may use a remote control. Thus, a single television converter may accept commands from several remote controls where each remote control controls the content sent to a specific television.

The remote controls may have two functions. First, the remote control may control the television. For instance, the remote control may turn the television on or off and adjust the volume. Second, the same remote control may change channels and command other operations of the television converter such as trick mode functions, EPG navigation, and the display and operation of various menus. Changing the channel may require the remote to operate the television converter. Therefore, the remote control may operate two separate electronic devices—the television and the television converter.

BRIEF SUMMARY OF THE INVENTION

The present invention is a method for associating a remote control with a television or televisions that they operate.

The present invention further provides the user with a method of identifying and associating a remote control with a television.

In addition, the present invention provides for an electronic identifier for each remote control. The identifier helps the television converter determine which remote control is associated with which tuner. Thus, the television converter may use the identifier to pair the remote control with a certain television.

In particular, the invention is a method for using visual or tactile indicia to identify which remote controls are associated with which televisions. The present invention also includes a method for electronically associating a remote control with a television. Other features and advantages of the present invention will become apparent from the following detailed description of the invention and the accompanying drawings.

DETAILED DESCRIPTION OF THE INVENTION

Figure 1:
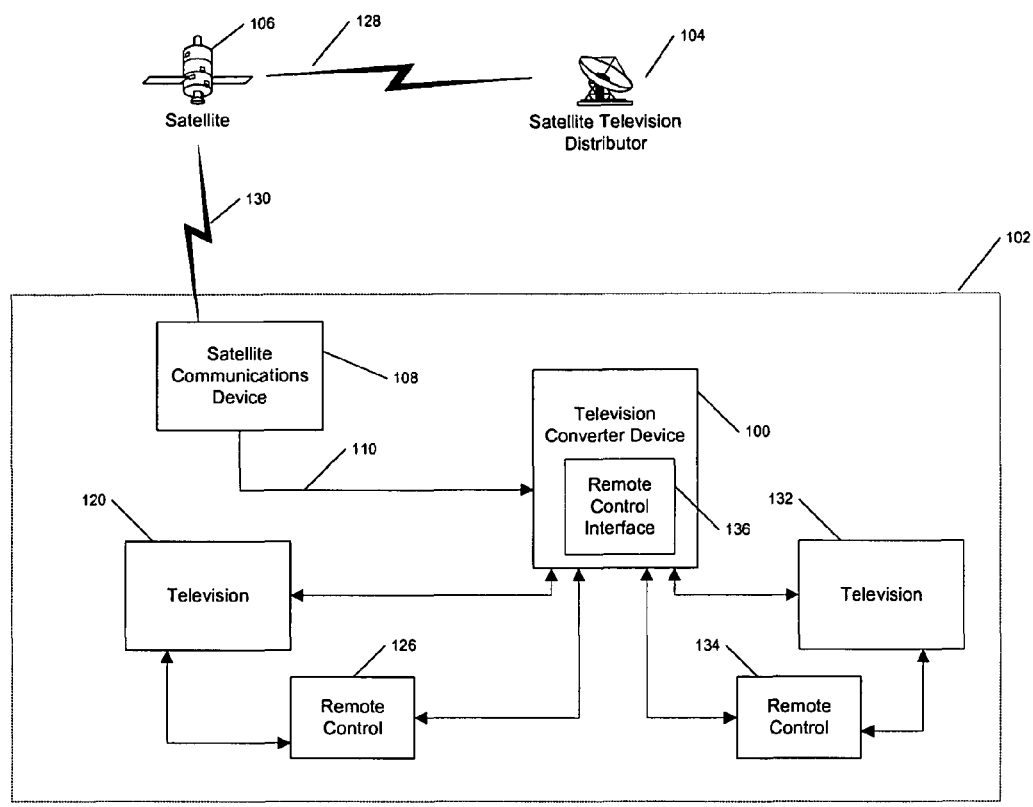
FIG. 1 illustrates a home entertainment system utilizing a television converter in accordance with an embodiment of the present invention.

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recording (DVR) devices. The present invention may also be applicable to digital-versatile-disc (DVD) recording devices or other television recording devices. One skilled in the art will recognize that the present invention can apply elsewhere.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood by one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and PVR. For the remainder of this disclosure, specific embodiments will be described using a television converter device that implements satellite technology.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity.

Thus, in satellite television service a channel may not be the same as in broadcast television service. Rather, channels may be more properly termed service providers in satellite television service. The term "channel" will be used in this description to describe the service providers and the virtual channels they may occupy.

FIG. 1 presents an embodiment of a home entertainment system 102 that includes a television converter device 100 in the form of a satellite set-top-box. Generally, the satellite set-top-box 100 may receive one or more television signals from a cable television distributor (not shown), from a broadcast television distributor (not shown) or from a satellite television distributor 104. As a preferred embodiment, home entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a televisions 120, 132. The satellite set-top-box 100 also may accept commands from remote controls 126, 134 or other peripheral electronic devices. More detail about the functionality of the satellite set-top-box 100 is provided below.

To further describe the home entertainment system, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

In embodiments of the present invention, the satellite set top box 100 may be connected to two televisions 120 and 132. One skilled in the art will recognize that the present invention may also apply to a home entertainment system 102 containing three or more televisions. In one embodiment, the user may instruct, with the remote control 126 or 134, the satellite set top box 100 to display a television program. The selected television program may then be transmitted to the corresponding television 120 or 132 in response to this user command. The television display devices 120 and 132 may be any devices capable of projecting a television program. These devices may include televisions, high definition televisions, computer monitors, or projection television systems. One skilled in the art will recognize that other television display devices are possible.

The two televisions 120 and 132 may be collocated in the same room or in different rooms of a building. Regardless of their location, the one satellite set top box 100 may supply television signals to each television 120 and 132. Each of these televisions 120 and 132 may use a different remote control. The first television 120 may use one remote control 126. The second television 132 may use a different remote control 134. Either remote control 126 and 134 may send operating commands to the remote control interface 118. The remote control interface 118 may recognize that the first remote control 126 may be used only with the first television 120 and the second remote control 134 may be used only with the second television 132. The remote controls 126 and 134 may not be interchangeable. One skilled in the art will recognize the three or more remote controls are also possible in home entertainment system 102.

If the user is unable to differentiate between the remote controls, he or she may try to operate a television 120 using the wrong remote control 134. Thus, in embodiments of the present invention, some indicia on the remote control may associate the remote control with its respective television. A second matching indicia may also be placed on the television. The different indicia are explained later. Thus, in one embodiment of the present invention, the user may verify that a remote control is associated with a certain television by checking whether the indicia on the remote control matches the indicia on the television. One skilled in the art will recognize that more than two televisions may be connected to the satellite set top box 100. In this situation, the problem and need for the indicia may become more important.

Figure 2:
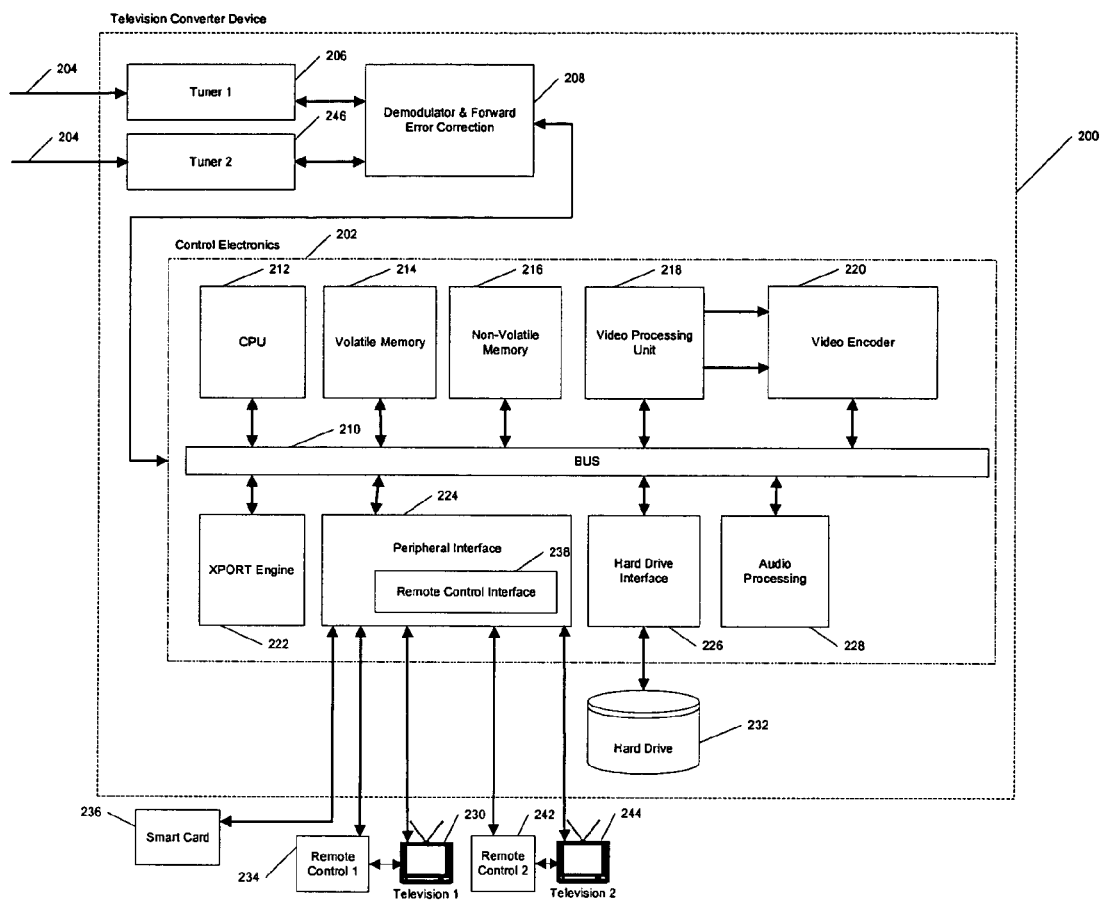
FIG. 2 illustrates a functional block diagram of the logical elements of an embodiment of a television converter in accordance with the present invention.

FIG. 2 provides a high level block diagram for the satellite television converter device 100, 200 with DVR functionality in accordance with the present invention.

The signal 110, 204 that arrives at the satellite set top box 200 may undergo extensive processing. The television converter 200 may include one or more tuner devices 206, 246 that may receive a satellite signal 204. In this embodiment, tuner devices 206, 246 acquire a satellite signal 204 from satellite television distributor 104. Tuner devices 206 and 246 may initially process the satellite signal 204. Tuner devices 206 and 246 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner devices 206 and 246 may include fewer, more, or different components. In one embodiment, as shown in FIG. 2, the two tuners 206 and 246 may receive the same signal 204. One skilled in the art will recognize that tuners may receive different signals, including, but not limited to, two separate signals from two satellites. The first tuner 206 may supply television signals to the first television 230. The second tuner 246 may supply the second television 244. Both tuners 206 and 246 can function separately and independently. Commands sent to one tuner may not affect the other tuner. Thus, while each tuner is housed in the same satellite set top box 100, the satellite set top box 100 may send different television signals to two or more televisions. One skilled in the art will recognize that many ways of tuning television signals are possible, including, but not limited to, band-stacking signals into frequency bands of a single signal.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein. One skilled in the art will also recognize that demodulation and FEC unit 208 may accomplish other functions, including, but not limited to, bandstacking two or more signals received by two or more tuners 206, 246.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In a preferred embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic G11 family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. A preferred embodiment of control electronics unit 202 contains a single CPU 212 that is operatively connected to the shared bus. In one embodiment, CPU 212 may be used, among other things, for logical operations for set-top-box 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may also contain one or more volatile memory components 214. Volatile memory components 214 may include, but are not limited to, one or more SDRAM memory chips. Similarly, control electronics unit 202 may contain non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In a preferred embodiment, signal 204 is in digital form (e.g., a digital stream) after demodulation and error checking. For example, digital stream 204 may use, but is not limited to using, the digital video broadcasting (DVB) transport standard. The digital stream 204 may be multiplexed and therefore require demultiplexing by XPORT Engine 222. Demultiplexing, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG or MPEG2 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In a preferred embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. As a preferred embodiment, video encoder 220 may translate digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more hard drive interfaces 226 and hard drives 232. In a preferred embodiment, television converter device 200 contains one hard drive interface 226 and hard drive 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite set-top-box 200. As another example, hard drive 232 may be used to temporarily store data for processing by CPU 212. In this example, the hard drive 232 may allow the processor 212 to separate EPG data arriving as part of digital stream 208. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite set-top-box 200. For example, an external hard drive 232 may be connected to satellite set-top-box 200 using USB 2.0 or IEEE 1394 (FireWire) connections. Such an external hard drive may include a screen for portable viewing of programming stored on it.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo (not shown), television 230, smart card 236, VCR (not shown), or other devices. In a preferred embodiment, home entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder (not shown), on the other hand, may send video or audio signals to the satellite set-top-box 100 or receive audio and video signals from the set-top-box to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

As set forth in the preferred embodiment, home entertainment system 102 may also include remote control 126, 134, 234, 242 peripheral devices, also sometimes referred to as a remotes. The remote controls 234, 242 may be used to send commands to the satellite set-top-box 200. The remote controls 234, 242 may send commands via a wireless connection using, for example, infrared or UHF transmitters within the remote control 234, 242. One example of an embodiment of a remote controller 234, 242 is the EchoStar Technologies Corporation 721 Platinum Plus Remote, Part Number 121150, that includes an IR transmitter and an ultra high frequency (UHF) transmitter. The remote controls 234, 242 may be able to send signals to other peripheral electronic devices that form part of the home entertainment system 102, including, but not limited to, a television, stereo, VCR, or DVD player. The set-top-box 200 may also be able to send signals to remote controls 234, 242, including, but not limited to, signals to configure the remote controls 234, 242 to operate other peripheral devices in home entertainment system 102. In some embodiments, the remote controls 234, 242 have a set of Light Emitting Diodes (LEDs). Some remote controls may include Liquid Crystal Displays (LCDs) or other screens. The remote controls may include buttons, dials, or other man-machine interfaces. While the remote controls 234, 242 may often be the common means for a subscriber to communicate with the satellite set-top-box 200, one skilled in the art will recognize that other means of communicating with the set-top-box 200 are available, including, but not limited to attached keyboards, front panel buttons or touch screens.

The satellite set-top-box 200 may also include a remote control interface 238. A remote control interface 238 may include any means for the user to communicate to the satellite set-top-box 200, and may be implemented using the peripheral interface 224 of control electronics unit 202 or by connecting a peripheral remote control interface device. In a preferred embodiment, a remote control interface may receive commands from one or more different remote controls 234, 242. Remote controls 234, 242 may use infrared, UHF, or other communications technology. The remote control interface 238 may therefore translate an input from the user into a format understandable by the control electronics unit 202. The translation systems may include, but are not limited to, electronic receivers and electronic relays. One skilled in the art will recognize that other means to receive and translate user inputs are possible.

The remote controls 234 and 242 may each have a separate identifier. In one embodiment, this identifier is an electronic signal that is specific to that remote control. The electronic signal may be analog or digital. An analog identifier may be a signal of a specific frequency, a specific amplitude, or specific waveform. In digital form, the signal may be a bit or set of bits that represent a code specific to the remote control 234 or 242. The electronic signal may be associated with a certain tuner 206, 246. In other words, the control electronics 202 may store a data table or similar data structure that associates each remote control's identifier to certain tuners 206, 246 and televisions 230, 244. Thus, the data table may indirectly correlate remote controls 124, 126 to televisions 120, 122. The remote control interface 238 or the control electronics 202 may recognize the signal coming from a certain remote control 234 or 242. After recognizing the source, the control electronics 202 may correlate the signal with a television 230 and 242 and send channel selection commands to the appropriate tuner 206 or 246.

Another peripheral device and connection to the satellite set-top-box 200 may include a phone line (not shown) and modem (not shown). Set-top-box 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 200. For example, the phone line may communicate with the satellite set-top-box 200 using an RJ-11 style telephone connection. One skilled in the art will recognize that there are many other uses for this phone line connection. For example, EPG data may be transmitted to set-top-box 200 via phone line or in the satellite signal 204. One skilled in the art will recognize that the EPG data may be transmitted to set-top-box 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data.

Figure 3:
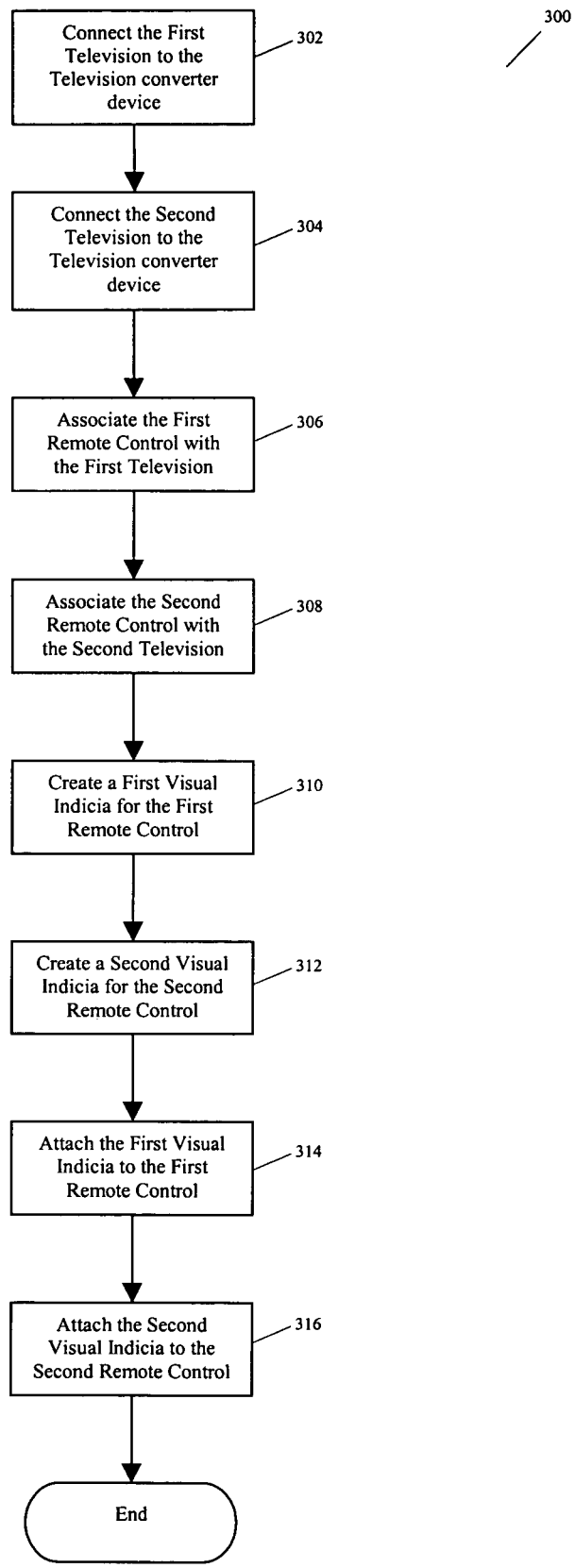
FIG. 3 illustrates one embodiment of the method for attaching visual indicia to remote controls in accordance with the present invention.

FIG. 3 describes one embodiment of a method 300 for associating visual indicia with a remote control and television. In accordance with method 300, the user may make a connection 302 between the first television 230 and the satellite set top box 200. In more detail, the connection 302 may be made by the peripheral interface 224 of the satellite set top box 200 to the first tuner 206. The second television 244 may be connected 304 to the peripheral interface 224 in the satellite set top box 200 and, in turn, the second tuner 246. Thus, two televisions 230 and 244 can be connected to the two tuners 206 and 246 in the same satellite set top box 200. Thus, operating the control electronics 202 may change the channel being delivered to the first television 230 by the peripheral interface 224 and likewise, the control electronics 202 may change the channel on the second television 244. It should be noted that channel selection may involve not only tuning but demodulation and demultiplexing.

The satellite set top box 200 may associate each television with a tuner. Also, the satellite set top box 200 may associate each remote control with a television output. Thus, the tuner may be associated 306, 308 with the remote control, and the remote control may be indirectly associated with the television. Each television 230 and 244 may have a remote control 234 and 242. The remote control 234 or 242 may operate the television 230 or 244 and also operate the tuners 206 or 246 in the satellite set top box 200. By sending wireless signals to the television 230, the remote control 234 may turn the television 230 on or off and adjust the volume. Sending commands to the set top box 200 may change the channel. With multiple televisions, there may also be multiple remote controls, all associated to their respective televisions. This embodiment is explained in more detail in FIG. 4.

In addition to associating 306, 308 the remote controls 234 and 242, visual indicia may be created 310, 312 to associate the remote controls with their respective televisions. Visual indicia may be created by the user or by the supplier of the satellite set top box 200 and provided with the satellite set top box 200. For instance, the visual indicia may be a set of stickers included with the satellite set top box 200. In other embodiments, the visual indicia may require the user to make a print out on a home computer. One skilled in the art will recognize that other methods of creating visual indicia are possible.

Visual indicia for each remote control 234 or 242 associated with a television 230 or 244 may be created. The indicia may be different. The difference may help the user distinguish between the several indicia. A difference may mean the indicia are different colors or the visual pattern is different. One skilled in the art will recognize that the possible differences between indicia may be varied and abundant.

The first indicia may be attached 314, 316 to the first remote control 234. In like manner, the second indicia may be attached to the second remote control 242. Attaching the indicia may be done in several ways. For example, the visual indicia may be stickers and, in this embodiment, the stickers may be peeled off a contact sheet and stuck to the remote control 234 or 242. In another embodiment, the indicia may be mechanically attached. Mechanical attachment may encompass any method of securing the indicia to the remote control 234 or 242 with a mechanical apparatus. For instance, the indicia may slide into a set of parallel channels that hold the indicia by friction. A binder clip, similar to the office supply, may be opened and the indicia secured in the clip. In another embodiment, the indicia may be a cover plate that snaps into slots present in the body of the remote control 234 or 242. One skilled in the art will recognize that other methods of mechanically securing the indicia are possible.

Figure 4:
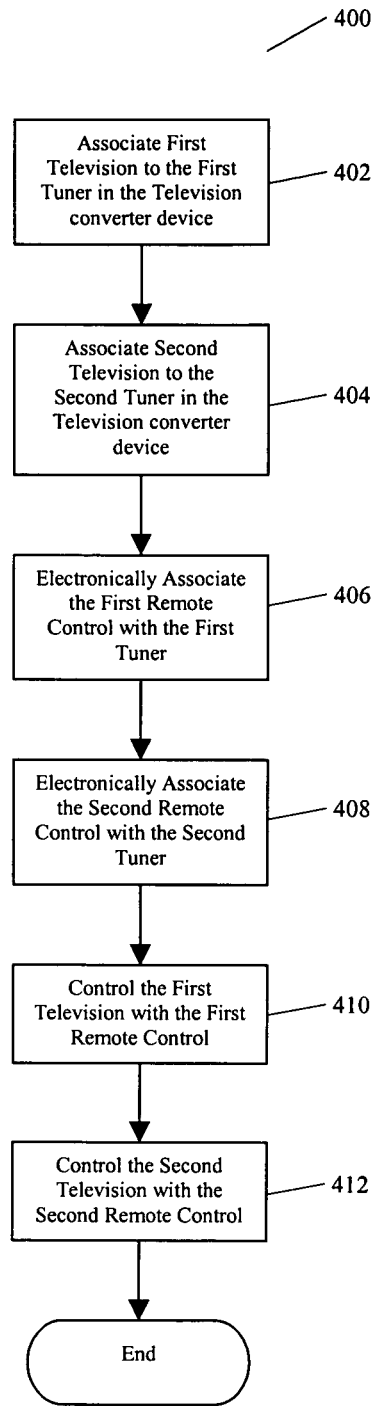
FIG. 4 illustrates one embodiment of the method for associating remote controls with televisions in accordance with the present invention.

In FIG. 4, an embodiment is shown of the method 400 for electronically associating remote controls 234 and 242 to televisions 230 or 244. Again, the first television 230 may be associated 402 to a first tuner 206 in the satellite set top box 200. The second television 244 may be associated 404 similarly. One remote control 234 may operate the first television 230 and tuner 206. Another remote control 242 may operate the tuner 246 that may be connected to the second television 244. Therefore, at least two remote controls 234 or 242 may be correlated to two separate tuners 206 and 246. The satellite set top box 200 may recognize signals sent from each of the remote controls 234 or 242 and send the commands to the tuner 206 or 246 that may correspond to those remote controls. This recognition may involve the control electronics 202 associating the remote controls 234 or 242 with the tuner 206 or 246 used with a specific television 230 or 244.

The first remote control 234 may be associated 406 with the first television 230. This process may require the satellite set top box 200 to establish which tuner is attached to the first television 230. This may be done by a challenge and response session whereby the control electronics 202 may send a prompt through the tuner 206 to the television 230. The prompt requires the user to respond by using the remote control 234. If the user returns a response, the control electronics 202 may understand that tuner 206 is connected to the first television 230. The control electronics 202 may then create a data entry.

The data entry may be a table of or a set of correlated data. In other words, the control electronics 202 may match the code or identifier of the remote control 234 or 242 with the tuner 206 or 246 and may store the information. When the remote control 234 or 242 is used, the control electronics 202 may access the data entry and determine to which tuner 206 or 246 to send the command. The data entry may be a table or other data record.

Another method for determining which remote control 234 or 242 belongs with which television 230 and 244 may be to determine the method of transmission by the remote control. As explained earlier, one television may be in a room separated from the satellite set top box 200. In this situation, the remote television may use the UHF transmission band to send commands to the satellite set top box 200. A remote control located in the same room may use the IR transmission method, the UHF transmission band or both simultaneously. The remote controls may be identified with the televisions on this basis. Programming sent to the remote television may be changed with the UHF remote control. Thus, that television may then always be identified with that remote control. The opposite may be true for the local remote control and television. One skilled in the art will recognize other methods and means of correlating the data are possible. After associating the first remote control to a certain tuner, the second remote control may be associated in similar manner 408.

Once associated 406, 408, the user may use the remote control 234 to control 410 the operation of the television 230 and the tuner 206. By controlling the television 230, the user may power the television 230 on or off and may change the volume. The user may also change the channels by controlling the tuner 206 in the satellite set top box 200. The user also may now use the remote control 242 to control 412 the second television 244 and the second tuner 246. Both the first remote control 234 and the second remote control 242 operate a television 230 or 244.

Figure 5:
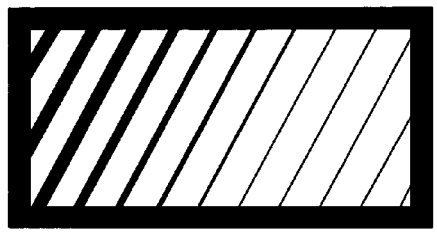
FIG. 5 illustrates one embodiment of pattern-like visual indicia in accordance with an embodiment of the present invention.
Figure 5:
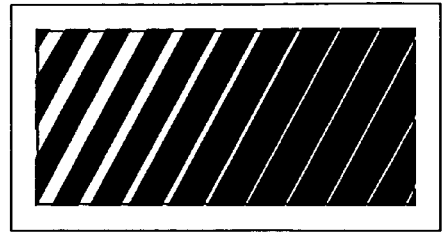

FIG. 5 shows one embodiment of visual indicia in accordance with the present invention. Visual indicia may include any type of visual pattern. In the embodiment shown, the visual indicia are a set of lines of different sizes. The lines may be slanted. In one of the visual indicia of this embodiment, the lines are black on a white background. In the other indicia of this embodiment, the lines are white and the background is black. Thus, the shades of the indicia may be transposed. Color may also be used in indicia. One skilled in the art will recognize it is possible to create a multitude of visual patterns for indicia.

Figure 6:
FIG. 6 illustrates one embodiment of alphanumeric visual indicia in accordance with an embodiment of the present invention.
Figure 6:

In FIG. 6, the visual indicia are slightly different. In this embodiment, the visual indicia may use alphanumeric designations to identify the remote control. One visual indicia reads "Television 1," indicating that the remote control 234 goes with the first television 230. The second remote 242 indicates it is associated with the second television 244. Any type of alphanumeric characterization may be used for the visual indicia.

Figure 7:
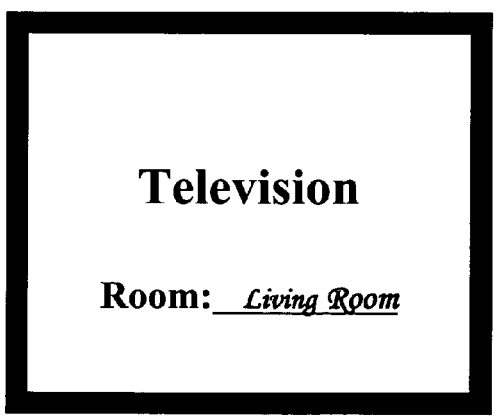
FIG. 7 illustrates one embodiment of user created visual indicia in accordance with an embodiment of the present invention.
Figure 7:
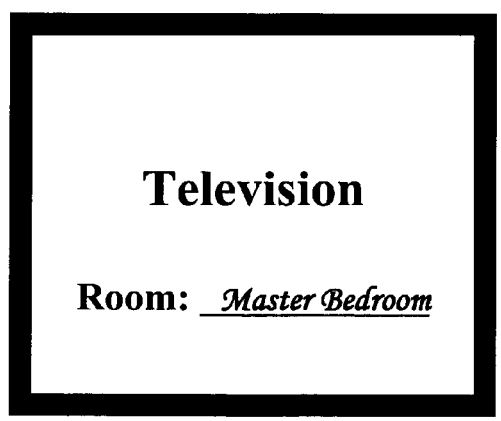

FIG. 7 is yet another embodiment of the visual indicia. In this embodiment, the user may record on the visual indicia the room to which the television is located. The user recorded that one television 230 is in the "Living Room" and another television 244 is in the "Master Bedroom." This embodiment reflects the possibility that the user may be involved in the creation of the visual indicia. User involvement may be simple recordation of the room to which the television is located or may require the user to print out the visual indicia using a computer. One skilled in the art will recognize that it is possible to involve the user in numerous ways to create the indicia. One skilled in the art will recognize that other user creations for visual indicia are possible beyond identifying the location of a television. For example, visual indicia may identify a person's name such that a family may distinguish between remote controls for each family member.

Figure 8:
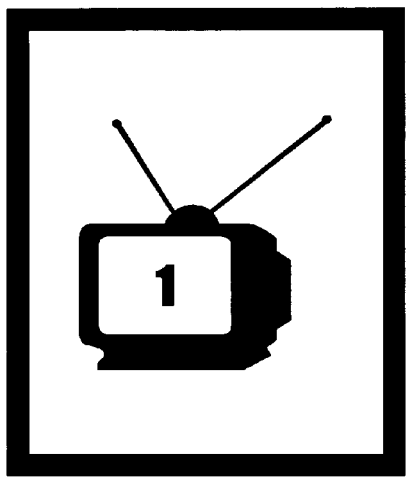
FIG. 8 illustrates one embodiment of combined alphanumeric and pattern-like visual indicia in accordance with an embodiment of the present invention.
Figure 8:
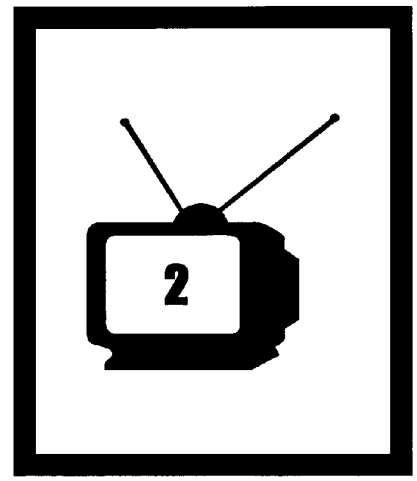
Figure 8:
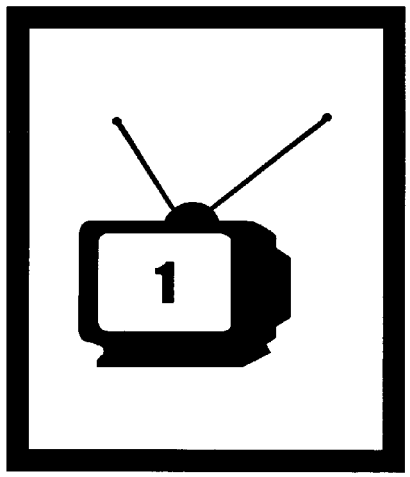
Figure 8:
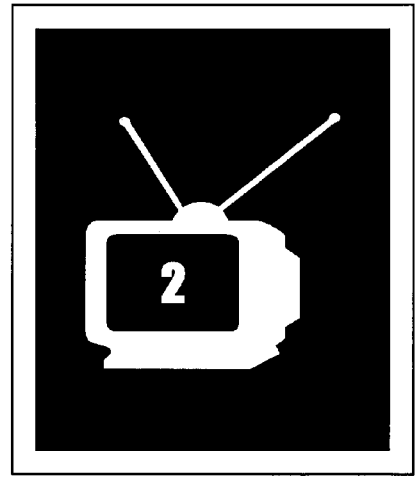

FIG. 8 represents another embodiment of the visual indicia. In the embodiment shown, the indicia may be both graphical and visual indicators of the association of the remote control to the television. The numbers "1" and "2" may represent the two televisions with which the remote controls are associated. The different background colors, either white or black, demonstrate that the indicia may use subtle visual indications of the association.

Figure 9:
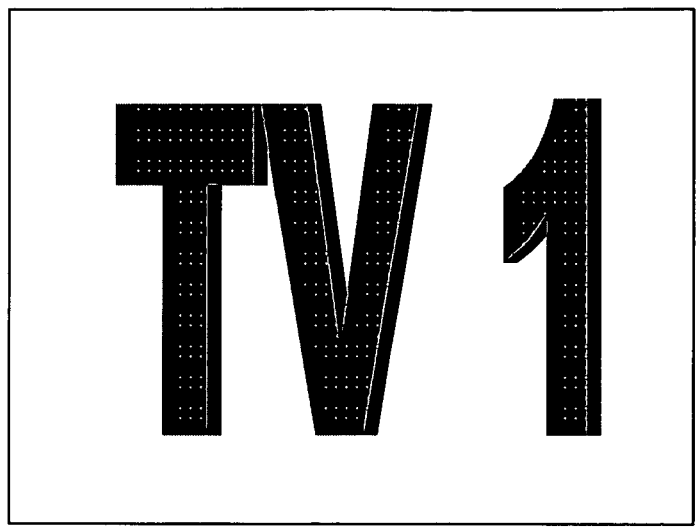
FIG. 9 illustrates one embodiment of three-dimensionally raised indicia that is both visual and tactile in accordance with an embodiment of the present invention.

FIG. 9 represents another embodiment of the possible indicia. Beyond the visual clues, the indicia may also use tactile indicia to represent the association of the remote controls to their television. A three dimensional indicia may allow the user to both see and feel the indicia. In this embodiment, the letters "TV 1" may use raised lettering. The raised lettering may be molded into the case of the remote control or a cover plate that is placed on the remote control. In other examples, the lettering may be embossed on a sticker. The lettering may also be indented, such as an etching. One skilled in the art will recognize that other methods are possible for creating or representing the indicia as three dimensional lettering or patterns.

Figure 10:
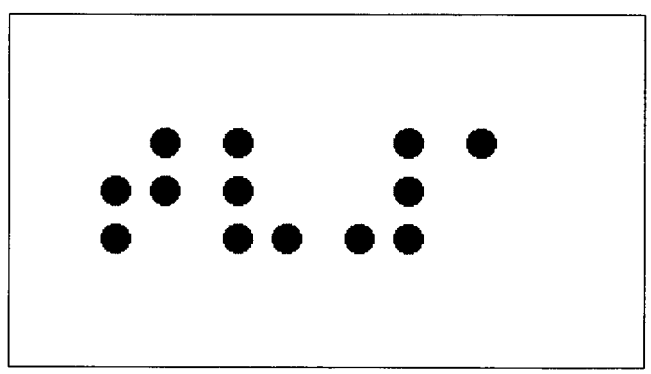
FIG. 10 illustrates one embodiment of Braille indicia for the seeing-impaired in accordance with an embodiment of the present invention.

FIG. 10 shows another embodiment of the indicia. In this example, the indicia may use Braille lettering. In this embodiment, the lettering reads "TV #1." Such indicia may allow, for example, a seeing impaired individual to recognize the remote control 234 as belonging to a certain television 230. Since many pay television distributors also provide audio entertainment, the use of Braille indicia may be needed. Several audio receivers or televisions may be connected to the satellite set top box 200. Thus, seeing impaired individuals with a multitude of televisions or audio receivers using the pay television service may recognize which remote is associated with which television or audio receiver.

In the above examples, the visual indicia may be stickers. The stickers may have the indicia on one face of the sticker and an adhesive compound coating the opposing face. To attach the indicia, the user may peel the sticker from a paper and affix the sticker to the remote control. Other methods may be possible for attaching the visual indicia to the remote control.

Figure 11:
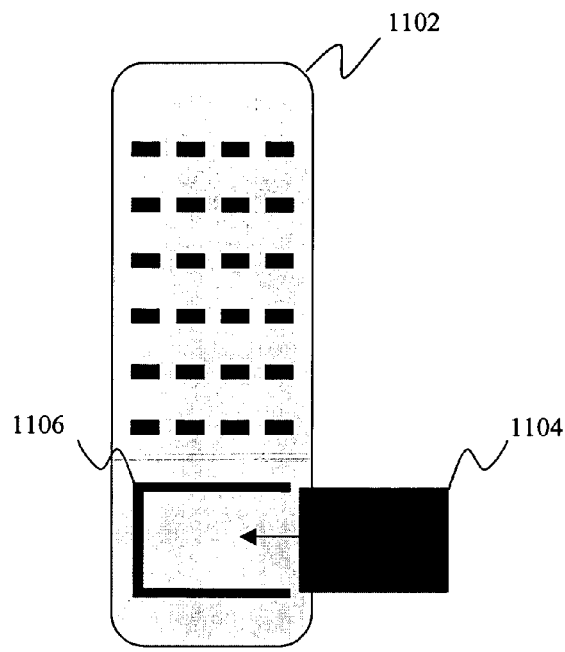
FIG. 11 illustrates an embodiment for mechanically securing the visual indicia to a remote control.

In FIG. 11, one embodiment for mechanically securing the visual indicia is shown. The visual indicia 1104 may be a rigid card. For instance, the indicia 1104 may be a plastic or compressed cardboard material. Another embodiment of 1104 may use a laminated paper card. The card may be sufficiently rigid to maintain its planar structure. The indicia 1104 may slide into a channel 1106 created on the remote control 1102. The channel may have at least two sides that can be parallel to each other. Those sides may be separated by a distance substantially equal to the width of the indicia. The sides may hold the indicia 1104 to the remote control face. Thus, the indicia 1104 may be held in place by friction.

Figure 12:
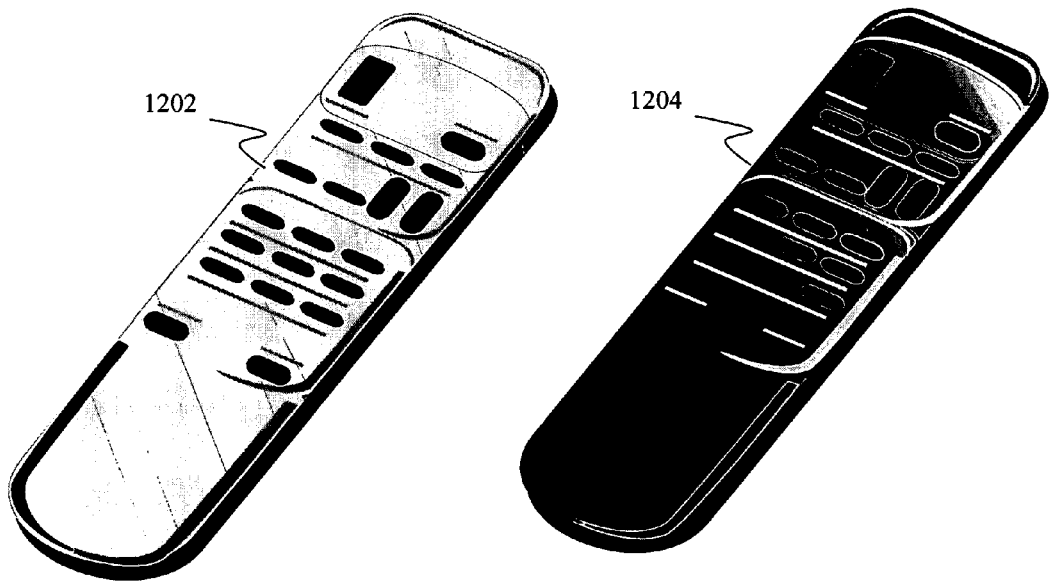
FIG. 12 shows another embodiment of the visual indicia.

FIG. 12 shows another embodiment of the visual indicia. The visual indicia created in accordance with the present invention may be something other than attachable indicia. In FIG. 12, two remote controls are shown. The first remote control 1202 may have a certain color. The casing of the remote control may be formed from colored plastic. Coloration may be any color possible, including, but not limited to, opaque or transparent. For instance, the first remote control 1202 may be an opaque red. The second remote control 1204 may have a different color. For instance, the second remote control 1204 may be green. The color of the remote controls may provide the visual indicia to match the remote control to a television.

Figure 13:
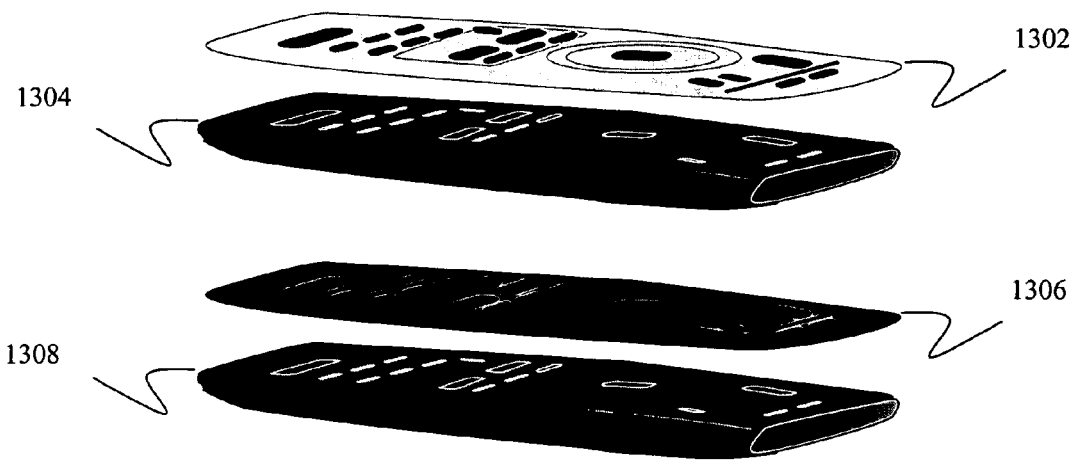
FIG. 13 shows yet another embodiment of the visual indicia.

FIG. 13 shows another embodiment of the visual indicia. Instead of placing a sticker or small card on the remote control, the user may place a cover plate 1302 on remote control 1304. The cover plate may have a specific design or a color. For example, cover plates 1302 and 1306, respectively for remote controls 1304 and 1308, use different colors. The differences in the cover plates may provide the visual indicia. The user may identify which television the remote belongs with by associating the look of the cover plate with the television. One skilled in the art may recognize that the cover plates can have different visual differences.

To secure the cover plates, the plates may be adhesively attached or secured with a tab the slides into a slot on the remote control. The cover plates may cover the entire face of the remote control, as shown in FIG. 13. However, the cover plate may also cover only a portion of the remote control. One skilled in the art will recognize other methods of securing the cover plates.

Figure 14:
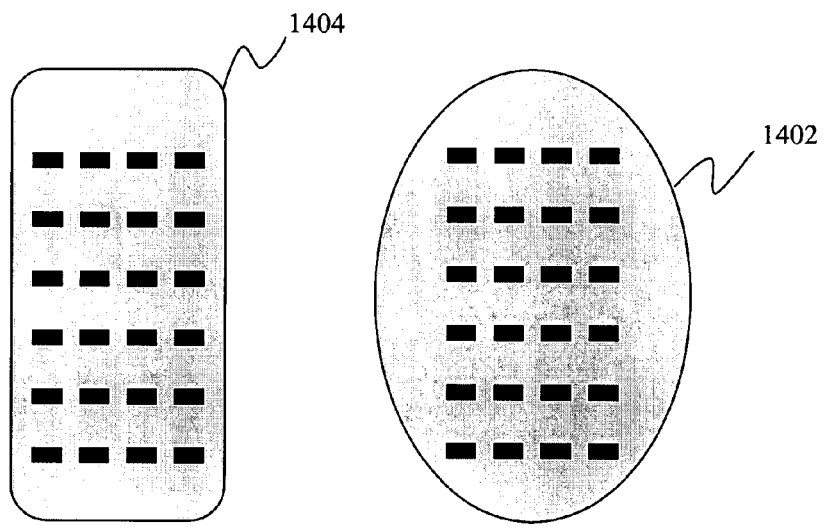
FIG. 14 shows several embodiments of remote controls distinguishable by shape.

Beyond cover plates and different colored remote controls, the remote control may have different shapes. For instance, as shown in FIG. 14, one remote may be round 1402 and another square 1404. Differences in shapes of the remote control may supply adequate visual indicia to distinguish the remote controls. One skilled in the art may recognize other visual indicia are possible. One skilled in the art will also recognize that combinations of visual indicia are also possible.

It should be noted that in accordance with an embodiment of the invention, corresponding indicia can be placed upon both a remote control and a corresponding television. The indicia on the television could be a sticker or any of the other indicia describe in connection with the remotes. In addition, in a preferred embodiment, the indicia can be graphically displayed by the set top box 200 on the television screen itself. For example the EPG that is displayed on a television screen may include either a color or designation, i.e. "REMOTE 1", which corresponds to a particular remote.

In addition to visual and tactile indicia, indicia for some embodiments of the present invention may include physical or electronic indicia that are recognizable by the remote controls 124, 126. In these embodiments, the remote controls may change the identifier that is transmitted to the satellite set top box 200 based on the properties of the indicia. The satellite set top box 200 of these embodiments may allow the user to associate one of the tuners with each indicia. The remote controls 234, 242 may include electrical contacts or physical contacts that interface with the indicia when installed. For example, a card like a credit card may contain the appropriate identifiers stored in memory, or a switch may select the appropriate identifier.

Yet another embodiment of a means of associating remote controls to tuners in the satellite set top box 200 may be to provide a toggle switch, for example in the battery compartment of the remote controls, that may select the identifier for the remote control to use.

Figure 15:
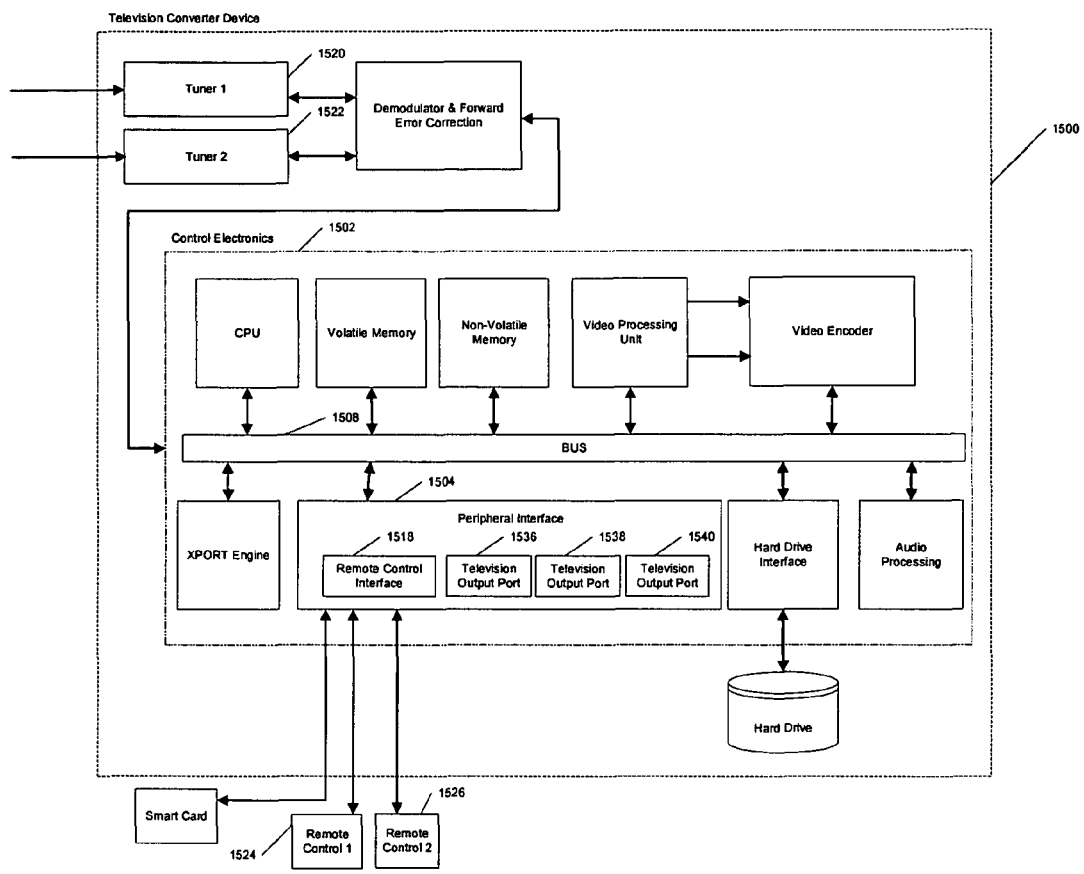
FIG. 15 illustrates yet another embodiment of a satellite set top box.

FIG. 15 illustrates yet another embodiment of a satellite set top box 100. The satellite set top box 1500 may include at least two tuners 1520 and 1522 connected to control electronics 1502. The tuners 1520 and 1522 may also be connected to peripheral interface 1504 and bus 1508, depending upon the implementation of the tuners. A remote control interface 1518 may also be provided. The satellite set top box 1500 may include more or fewer elements than those displayed. In addition, some of the elements may be combined into a single element.

The tuners 1520 and 1522 may be capable of independent operation as described with reference to FIG. 2. That is, both tuners may receive the signal provided by the satellite communication device and deliver television programming independent of the other tuner's status.

The satellite set top box 1500 in the embodiment is provided with multiple output ports (three output ports 1536, 1538, and 1540 are shown). The output ports may be one or more physical connectors for connecting the set top box 1500 to a television (not shown), such as through use of a cable or cables that can connect to the output port and a connection on the television. Examples of output ports 1536, 1538, and 1540 include, but are not limited to, audiovisual plugs, s-video receptacles, coaxial cable connectors, and fiber optic connectors. Other connectors are possible and considered within the scope of the invention.

In the embodiment shown, the tuners 1520, 1522 may be attached to an internal bus 1508 that allows each tuner to deliver television programming to any of the output ports 1536, 1538, and 1540. The bus 1508 may include electronics that allow the tuners to identify which output port should receive the television programming that the tuners are delivering. The bus 1508 may be as simple as one or more switches between the tuners and the output ports or may be implemented as a more complicated bus such as those found in computer systems. The implementation and use of buses 1508 to transmit data between devices or physical connections is well known in the art and need not be described in detail here.

In this embodiment, the satellite set top box 1500 includes a remote control interface 1518. This remote control interface 1518 may include any means for the user to communicate via a remote control 1524 and 1526 to the satellite set top box 1500. In a preferred embodiment, this remote control interface 1518 may receive commands from a set of several different remote controls 1524 and 1526. Remote controls 1524 and 1526 may use, but are not limited to, infrared, UHF, or other communication variants. One example of an embodiment of a remote controller 1524 and 1526 is the EchoStar Technologies Corporation 721 Platinum Plus Remote, part #121150, which has a pair of transmitters, an IR transmitter and an ultra high frequency (UHF) transmitter. One or more of the remote controls 1526 and 1524 may be able to send signals to other peripheral electronic devices that form part of the home entertainment system 102 such as the television, a stereo, a VCR, or a DVD player. In some embodiments, one or more of the remote controls 1524 and 1526 may have a set of Light Emitting Diodes (LED). Some remote controls may include Liquid Crystal Displays (LCD) or other screens.

The remote control interface 1518 may include any device to translate an input from the user into a format understandable by the control electronics 1514. The translation systems may include, but are not limited to, electronic receivers and electronic relays. One skilled in the art will recognize that other means to receive and translate user inputs may be possible.

The remote controls 1524 and 1526 may each have a separate identifier. In one embodiment, this identifier is an electronic signal that is specific to that remote control. The electronic signal may be analog or digital. An analog identifier may be a signal of a specific frequency, a specific amplitude, or specific waveform. In digital form, the signal may be a bit or set of bits that represent a code specific to the remote control 1524 or 1526.

In the embodiment shown in FIG. 15, a remote control identifier is associated with the output ports 1536, 1538, and 1540. This association may be implemented in different ways depending on the design of the set top box 1500. A predetermined association may exist in the set top box 1500 between identifiers of the remote controls 1524 and 1526 and specific output ports 1536, 1538, and 1540. Alternatively, one or more of the remote controls 1524 and 1526 may be programmable or alterable in some fashion to cause the remote control to change identifiers. Several such examples of changing the identifier associated with a remote control 1524 and 1526 have been provided above. If the identifiers can be changed, the association may involve the use of a data table or similar data structure that contains data that associates certain remote control identifiers to specific output ports 1536, 1538, and 1540 and therefore to specific televisions. In this case, the data table may be updated to indicate a change in an identifier to be associated with a television. Thus, the data table may indirectly correlate the remote control 1524 or 1526 to a specific television.

Using the association described above, the set top box may be able to distinguish or otherwise identify commands from the various remote controls, then execute the commands so that commands from a remote control associated with one output port control the delivery of television programming to that output port. In this way, a single set top box may be independently controlled by different remote controls to independently deliver television programming to multiple televisions. Although the set top box 1500, described above, was described as including three output ports, one skilled in the art will understand that any number of output ports, and therefore televisions, may be controlled in this fashion simply by providing additional remote controls, output ports and, depending on the implementation, tuners.

Figure 16:
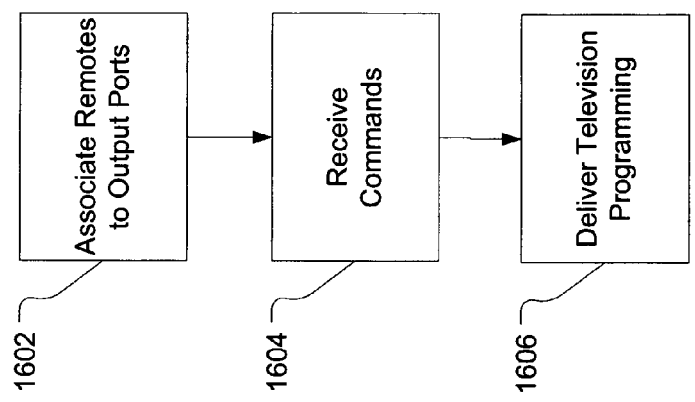
FIG. 16 illustrates a method of independently delivering television programming to televisions connected to a set top box.

FIG. 16 illustrates a method of independently delivering television programming to televisions connected to a set top box. The method includes an associating operation 1602 in which each remote control is associated with one of the televisions connected to the set top box. As discussed above, the association may involve determining an identifier used to identify each remote control and associating this identifier with a specific television via an association with the output port that the television is attached to. The association may be predetermined by the manufacturer of the set top box or remote controls, or programmable by the user. In addition, some remote controls may be pre-associated with specific output ports while others may be programmable by the user. The association may include the use of a data table stored in memory on the set top box or one or more of the remote controls, or both.

For example, the associating operation 1602 may include providing each remote control with its own identifier unique with respect to the other identifiers used by the other remote controls. Then, during an initial setup of the set top box for example, the user may be asked to associate each remote control with a specific television. The association may involve entering a programming/associating mode on the set top box, receiving an indication that the user wishes to associate a remote control with a specific output port or television, querying the user to issue a command using the remote control the user wishes to have associated with the television, receiving a command from the remote control, and creating an association between that remote control and the specified output port. Such a setup process may be repeated multiple times for each remote control and each output port.

Commands from the remote controls are received in a receiving operation 1604. In the receiving operation, the identifiers may also be received. For example, if the identifier is a digital code transmitted with or as part of the command, then the identifier will be received with the command. Alternatively, the identifier may be a frequency that the command is transmitted on or some other distinguishable feature of the command. In fact, in some cases the distinguishing feature may be the absence of an explicit identifier.

Embodiments of the commands are commands that direct the set top box to deliver or stop delivering television programming, such as a channel of television programming, to a television. For example, an embodiment of a command is "display the television programming on channel 152". As described above, this command may also include or be associated with an identifier that identifies to the set top box what remote control was the source of the command. Note that not all commands issued by a remote control need include the identifier, only those commands that require the set top box to know what television the command should be associated with may require the identifier.

In response to the commands (and their associated identifiers, if any) received, the set top box may deliver television programming as directed by the commands in a delivery operation 1606. For example, if a first remote control is associated with a first output port connected to a first television, then commands to display a specified channel of television programming from the first remote will result in the delivery of the specified programming to the first output port. Likewise, commands from a second remote control associated with a different output port television may control the delivery of television programming to that television. Note that the delivery operation 1606 may involve simultaneously delivering different channels of television programming to each output port on the set top box, if the commands received so direct.

In several of the foregoing embodiments, a tuner may deliver 1606 programming to an associated 1602 television or television output port. However, in a preferred embodiment, two tuners, in combination with a demodulator, demultiplexer, control electronics and other set-top-box components, may be regarded as multiple channel selection resources. The previous discussion regarding tuners associated with televisions may therefore apply in its entirety to channel selection resources, and is therefore incorporated by reference.

In this preferred embodiment, the tuners may be dynamically allocated as channel selection resources, such that the control electronics 202, 1502 may determine which tuner is most appropriate to deliver 1606 programming to a television or television output port. In this preferred embodiment, the association 1602 of a television or televisions and tuner or tuners may be unnecessary. For example, delivery operation 1606 may involve delivering the same channel of television programming from one transponder to two or more of the connected televisions, thus necessitating only a single tuner. In this situation, depending on the embodiment, only one tuner may be in use and the association 1602 of television and tuners may not be necessary since the control electronics 202, 1502 may not require any association to deliver the same programming to multiple or all televisions. This embodiment may also allow the control electronics to dynamically allocate idle tuners (e.g., tuners that are not delivering 1606 programming) for other set-top-box operations, including, but not limited to, housekeeping and receiving EPG updates. As another example, the specific association 1602 of a specific tuner to a specific television may be unnecessary where a single tuner may provide different programming to two televisions from the same transponder. One skilled in the art will recognize that many ways of delivering 1606 television programming are possible and within the scope of this invention.

It will be clear that the present invention is well adapted to attain the ends and advantages mentioned as well as those inherent therein. While a presently preferred embodiment in the form of a satellite set top box has been described for purposes of this disclosure, various changes and modifications may be made which are well within the scope of the present invention. For example, the embodiments described could be easily applied to television converter devices having more than two tuners and attached to multiple televisions throughout the subscriber's location. Numerous other changes may be made which will readily suggest themselves to those skilled in the art and which are encompassed in the spirit of the invention disclosed and as defined in the appended claims.

What is claimed is:

1. A television receiver comprising:
a first output configured to be coupled to a first display;
a second output configured to be coupled to a second display;
receiver circuitry configured to receive control signals from a first remote control and a second remote control;
a first tuner configured to receive multiple streams of television programming and to deliver one or more of the streams of television programming to the first or second output;
a second tuner configured to receive multiple streams of television programming and to deliver one or more of the streams of television programming to the first or second output; and
control circuitry coupled to the receiver circuitry and configured to process the control signals, to associate the first output with the first remote control, to associate the second output with the second remote control, to cause the first display to display a first visual indicia representing an identification of the first remote control and indicating that the first display is associated with the first remote control, to cause the second display to display a second visual indicia representing an identification of the second remote control and indicating that the second display is associated with the second remote control.

2. The television receiver of claim 1 wherein the first visual indicia corresponds to a first visual marker on the first remote control.

3. The television receiver of claim 2 wherein the second visual indicia corresponds to a second visual marker on the second remote control.

4. The television receiver of claim 1 wherein the control signals of the first remote control include a first identification code identifying the first remote control.

5. The television receiver of claim 1 wherein the control signals of the second remote control include a second identification code identifying the second remote control.

6. The television receiver of claim 3 wherein the control circuitry is configured to associate the first remote control with the second output when the second marker is coupled to the first remote control.

7. The television receiver of claim 6 wherein the control circuitry is configured to associate the second remote control with the first output when the first marker is coupled to the second remote control.

8. The television receiver of claim 1 comprising a bus coupled between the first and second tuners and the first and second output connections, the bus being configured to allow the first and the second tuners to selectively deliver television programming to the first and second output connections.

9. A television receiver comprising:
a first output configured to be coupled to a first display;
a second output configured to be coupled to a second display;
receiver circuitry configured to receive control signals from first and second remote controls;
a first tuner configured to receive multiple streams of television programming and to selectively deliver one or more of the streams of television programming to the first and second outputs;
a second tuner configured to receive multiple streams of television programming and to selectively deliver one or more of the streams of television programming to the first and second outputs;
control circuitry coupled to the receiver circuitry and configured to process a first control signal from a first remote control and associate the first output with the first remote control, to process a second control signal from the second remote control and associate the second output with the second remote control, to coordinate simultaneous reception of first and second television programs by the first tuner, to coordinate output of the first television program via the first output and the second television program via the second output, to process a third control signal and coordinate reception of a third television program by the second tuner and coordinate output of the third television program via the second output, to cause the first display to display a first visual indicia representing an identification of the first remote control and indicating that the first display is associated with the first remote control, to cause the second display to display a second visual indicia representing an identification of the second remote control and indicating that the second display is associated with the second remote control.

10. The television receiver of claim 9, further comprising:
a storage medium storing one or more stored television programs;
wherein the control circuitry processes a fourth control signal from the second remote control, coordinates retrieval of a stored television program from the storage medium and output of the stored television program via the second output.

11. The television receiver of claim 9 wherein the first, second and third outputs are connected to the respective displays using a fiber optic connection.

12. The television receiver of claim 9 wherein the control circuitry is configured to identify that the second tuner is idle and coordinate reception of a content on a second transponder signal by the second tuner, wherein the data is not simultaneously output to the first and second outputs for display.

13. The television receiver of claim 12 wherein the content comprises electronic programming data.

14. The television receiver of claim 12 wherein the content comprises a fourth television program stored to a storage medium.

15. A television receiver comprising:
a first output configured to be coupled to a first display;
a second output configured to be coupled to a second display;
a third output configured to be coupled to a third display;
receiver circuitry configured to receive control signals from a first remote control, a second remote control and a third remote control;
a first tuner configured to receive multiple streams of television programming and to selectively deliver one or more of the streams of television programming to the first, second and third outputs;
a second tuner configured to receive multiple streams of television programming and to selectively deliver one or more of the streams of television programming to the first, second and third outputs;
control circuitry coupled to the receiver circuitry and configured to process a first control signal and associate the first output with the first remote control, process a second control signal and associate the second output with the second remote control and process a third control signal and associate the third output with the third remote control, to coordinate simultaneous reception of first and second television programs from a first transponder signal by the first tuner, to coordinate reception of third television program from a second transponder signal by the second tuner, coordinate the output of the first television program through the first output, to coordinate the output of the second television program through the second output and coordinate the output of the third television program through the third output, to cause the first display to display a first visual indicia representing an identification of the first remote control and indicating that the first display is associated with the first remote control, and to cause the second display to display a second visual indicia representing an identification of the second remote control and indicating that the second display is associated with the second remote control.

16. The television receiver of claim 13, further comprising:
a storage medium storing one or more stored television programs;
wherein the control circuitry processes a fourth control signal from the second remote control, coordinates retrieval of a stored television program from the storage medium and output of the stored television program via the second output.

17. The television receiver of claim 13 wherein the first, second and third outputs are connected to the respective displays using a fiber optic connection.

18. The television receiver of claim 13 wherein the control circuitry is configured to identify that one of the first, second and third tuners is idle and coordinate reception of a content on a third transponder signal by the identified tuner, wherein the data is not simultaneously output to the first, second and third outputs for display.

* * * * *